United States Patent Office 3,776,982
Patented Dec. 4, 1973

3,776,982
PROCESS FOR THE PRODUCTION OF IMPACT RESISTANT TRANSPARENT POLYMERS OF VINYL CHLORIDE AND ACRYLIC ACID ESTER
Rene Nicolet, Walter Gutmann, and Theodor Volker, Freiburg, Switzerland, assignors to Lonza Ltd., Basel, Switzerland
Filed July 14, 1971, Ser. No. 162,346
Claims priority, application Switzerland, July 15, 1970, 10,743/70; Dec. 11, 1970, 18,369/70
Int. Cl. C08f 29/24
U.S. Cl. 260—884   12 Claims

ABSTRACT OF THE DISCLOSURE

A process for the production of impact-resistant and weather-resistant polymers of vinyl chloride by polymerization of vinyl chloride in the presence of polymers of acrylic acid esters. The process comprises polymerizing vinyl chloride in the presence of 2–10% by weight of a polymer of 2-ethylhexylacrylate with at least 50% by weight of 2-ethylhexylacrylate so that the polymerization of the vinyl chloride conducted at temperatures of from 50–65° C. with mixing at the saturation pressure of the vinyl chloride in the presence of liquid vinyl chloride such that the conversion amounts to 70%. The maximum mean particle diameter and the minimum mean particle diameter of the polymer of 2-ethylhexylacrylate is related to the concentration of the polymer of 2-ethylhexylacrylate in the polymer of the vinyl chloride.

FIELD OF INVENTION

The invention relates to processes for the production of impact-resistant and weather-resistant polymers of vinyl chloride with K-values of 60–75, by emulsion polymerization of vinyl chloride in the presence of preformed polyacrylate dispersions.

BACKGROUND

Various processes are known for the production of impact-resistant polyvinyl chloride. Thus, according to U.S. Pat. 3,019,208, vinyl chloride is grafted by an emulsion polymerization process on polyacrylic acid esters with 1 to 10 carbon atoms in the alcohol radical, using water-soluble catalysts, it being necessary to use quantities of 10 to 50% by weight of polyacrylates in order to achieve an improvement in the impact resistance. The disadvantage with the use of such large quantities of lower polyacrylates consists in the depression of the softening point. For avoiding these disadvantages, the emulsion polymerization of vinyl chloride is carried out in the presence of an emulsion of polyacrylic acid tridecyl ester in accordance with German Auslegeschrift 1,206,589, it also being possible to use smaller quantities.

SUMMARY OF INVENTION

The invention has as an object the provision of an improved method to produce impact-resistant and weather-resistant polyvinyl chloride.

The process according to the invention for the production of impact-resistant and weather-resistant polymers of vinyl chloride by polymerization of vinyl chloride in accordance with the emulsion polymerization process in the presence of polymers of acrylic acid esters is characterized in that vinyl chloride is so polymerized in the presence of 2–10% by weight, preferably 4–9 by weight, of a polymer of 2-ethylhexylacrylate with at least 50% by weight of 2-ethylhexylacrylate that the polymerization of the vinyl chloride is carried out at temperatures from 50–65° C. and with mixing at the saturation pressure of the vinyl chloride, in the presence of liquid vinyl chloride, at least until the conversion is 70%, the maximum mean particle diameter and the minimum mean particle diameter of the polymer of 2-ethylhexylacrylate which is to be used, depending on the concentration of the polymer of 2-ethylhexylacrylate in the polymer of the vinyl chloride, being calculated by the following equations: maximum mean particle diameter in $m\mu = 310 -$ (24 times concentration of the polymer of 2-ethylhexylacrylate in percent by weight) minimum mean particle diameter in $m\mu = 33 - (3.5$ times concentration of the polymer of 2-ethylhexylacrylate in percent by weight).

It is advantageous to use particle diameters which lie in the range of the formula for maximum mean particle diameter in $m\mu = 260 - (24$ times concentration of the polymer of 2-ethylhexylacrylate in percentages by weight) down to a minimum mean particle diameter in $m\mu = 33 - (3.5$ times concentration of the polymer of 2-ethylhexylacrylate in percentages by weight). In the case where the preferred range is used, polymers are obtained which are not only characterized by a good impact strength (notched) but also by transparency. It can be said quite generally that the impact strength is improved with increasing concentration of polyethylhexylacrylate, but the transparency decreases with increasing particle size of the polyethylhexylacrylate.

According to the formulae, a maximum mean diameter of the poly-2-ethylhexylacrylate particles of 94 $m\mu$, preferably 44 $m\mu$, and a minimum diameter of 1.5 $m\mu$, are the requirements for a concentration of 9% by weight of poly-2-ethylhexylacrylate in the polymer of the vinyl chloride. For a concentration of 5.5% by weight of the following values are given: mean diameter maximum 178 $m\mu$, preferably 128 $m\mu$, mean diameter minimum 14 mm.

DETAILED DESCRIPTION

Figure 1:
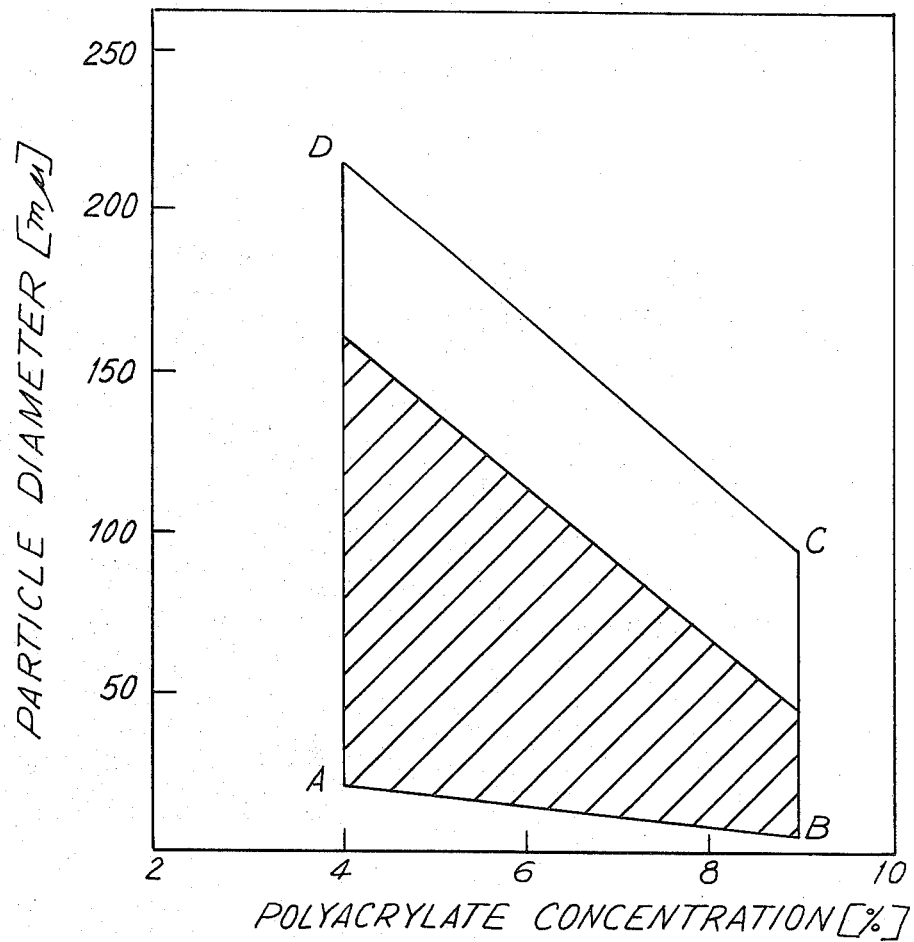
FIG. 1 is a diagram showing the range of the invention.

In the diagram of FIG. 1, the range of the invention is represented by the area ABCD. The hatched area corresponds to the preferred range.

It is advantageous to employ a polymer of 2-ethylhexylacrylate which contains more than 90% by weight of 2-ethylhexylacrylate.

As comonomers, there are to be used lower acrylates, for example, methyl, ethyl, propyl, isopropyl, butyl, isobutyl and hexyl acrylates.

For employing the process according to the invention, polymers of 2-ethylhexylacrylate with given and known mean particle diameters are taken. These polymers are preferably used in the form of aqueous dispersions. They can be produced by emulsion polymerization of 2-ethylhexylacrylate, possibly together with lower acrylates as comonomers, in the presence of water-soluble initiators and emulsifiers. The mean particle diameter of the formed polymers of the 2-ethylhexylacrylate is controlled in a manner known per se by the conditions of the emulsion polymerization.

Polyacrylate dispersions of different mean particle diameters can for example be produced by variations of the quantity of emulsifier being used. Mainly employed as emulsifiers are salts of fatty acids with a chain length of 12 to 18 carbon atoms. Advantageously the alkali or ammonium salts of lauric acid, myristic acid, oleic acid, coconut fatty acid, palmitic acid, stearic acid and others are used. These emulsifiers are suitably employed in quantities of 2 to 12% by weight, related to the monomeric acrylate. By way of exemple, if the emulsion polymerization of the 2-ethylhexylacrylate is carried out in the presence of 2% by weight of sodium laurate as emulsifier, the mean particle diameter of the polyacrylate amounts to about 139 mµ. However, if 6% by weight of sodium laurate are used, a mean particle diameter of about 47 mµ is obtained.

Another possibility of influencing the particle diameter of the polymers of 2-ethylhexylacrylate consists in the method of adding the monomeric acrylate and/or the emulsifier. By way of example, if 3% by weight are introduced during the reaction, the mean particle diameter amounts to about 72 mµ, as against about 47 mµ when all the quantity of emulsifier is initially supplied.

If polyacrylate dispersions with larger mean particle diameters are desired, the polymerization of the monomeric 2-ethylhexylacrylate can be carried out in the presence of a preformed latex of the polyacrylate. In this case, the polymerization conditions are so chosen that only the initially supplied polymer particles continue growing, without formation of new particles.

The mean particle diameter can in principle be determined by means af various methods, such as light dispersion measurements, with the aid of a disc-type centrifuge or by electron microscopy. In the last case, there is a danger of the polymer particles, with the preparation of the samples and/or with the measurement, being so greatly changed because of their low softening temperature by agglomeration or fusion that no reliable determination is any longer possible.

The soap titration has proved to be especially suitable, because of its simplicity. This method is known and has been used by several authors (Houben-Weyl XIV/1, page 369). It is based on the determination of the specific particle surface of the investigated dispersion. By designating with $d$ the mean particle diameter in mµ and with $E$ the quantity of emulsifier which is necessary for covering 1 g. of the polymer with a monomolecular emulsifier layer, and if the value 1.00 is assumed for the density of the polyacrylate, then according to Jacobi, Angew. Chem. 64, 539–543 (1952), there is produced the relationship $$d = \frac{9.4}{E}$$

for the titration with Mersolate K 30.

The polymerization of the vinyl chloride is carried out in aqueous emulsion.

As emulsifiers, mainly salts of fatty acids with a chain length from 12 to 18 carbon atoms are used, advantageously the alkali or ammonium salts of lauric acid, myristic acid, oleic acid, coconut fatty acid, palmitic acid, stearic acid and others are used. These emulsifiers are preferably employed in quantities of 0.05 to 1%, based on the vinyl chloride.

Employed as catalysts are water-soluble radical formers, such as peroxides, persulphates, azo compounds, Redox compounds. The quantity advantageously lies at 0.05 to 0.5% by weight, based on vinyl chloride.

The polymerization can be carried out in the presence of polymerization regulators. As polymerization regulators, mercaptans and saturated or unsaturated halogenated hydrocarbons are used. The quantity of regulator to be employed depends on its nature and the K-value which is to be adjusted. By way of example dodecyl mercaptan is used in quantities from 0.01 to 0.2% by weight, based on the vinyl chloride. Trichlorethylene or 1,2-dichlorethylene or bromoform are used in quantities from 0.1 to 5%. The K-value of the resulting vinyl chloride polymers should preferably amount to 60 to 75.

The polymerization is carried out by the aqueous dispersion of the 2-ethylhexylacrylate polymer being initially placed together with catalyst, emulsifier and possibly regulator in a pressure vessel equipped with a stirrer mechanism, and by the monomeric vinyl chloride being added, at least in such a quantity that the saturation pressure of the vinyl chloride is reached at a given reaction temperature.

After completing polymerization, the polymer is worked up in known manner, for example, by coagulation with addition of electrolyte, separation of the polymerization serum by centrifuging, washing and drying in a drum dryer or by spray drying or by spraying onto roller driers.

Figure 2:
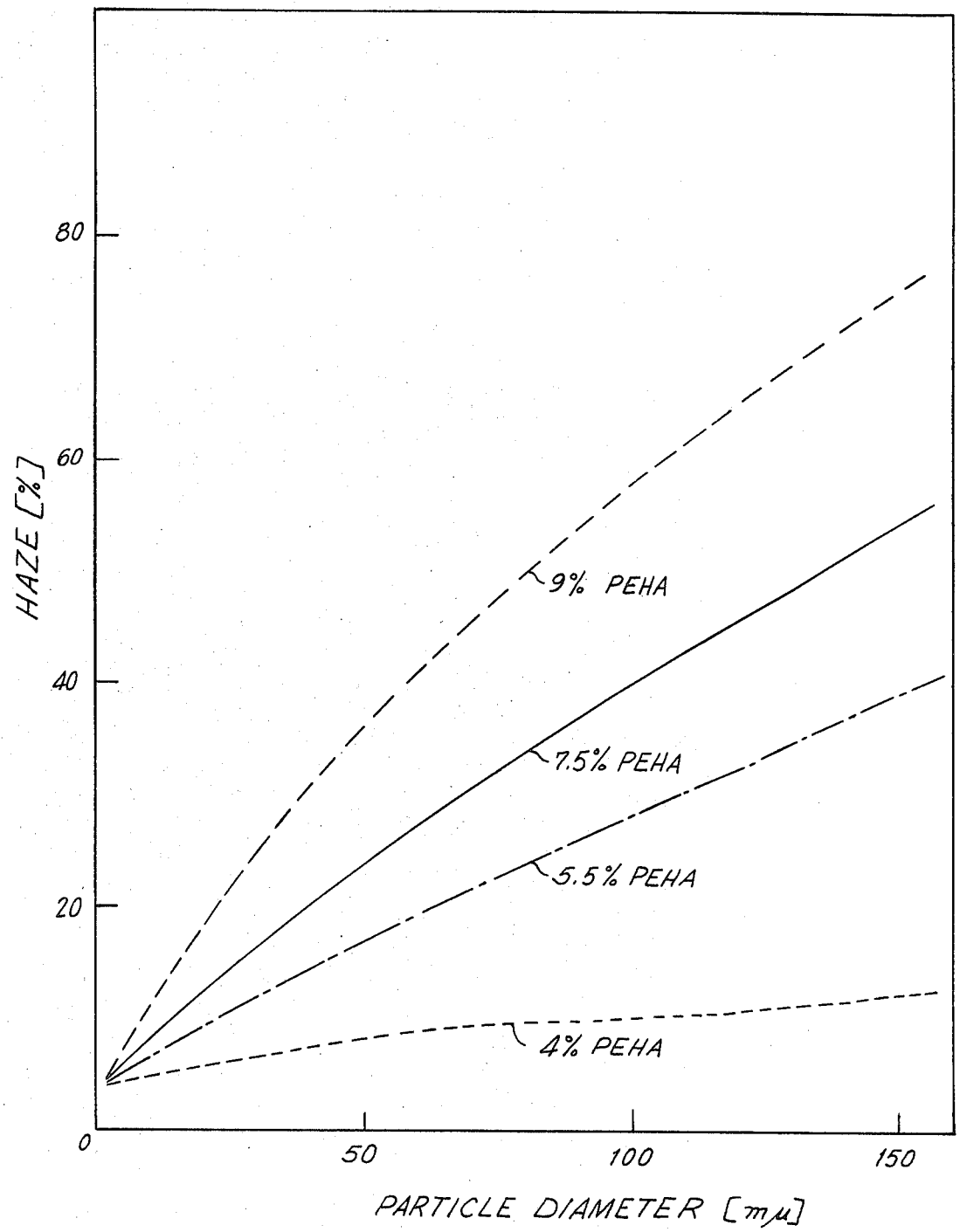
FIG. 2 is a plot of transparency.
Figure 3:
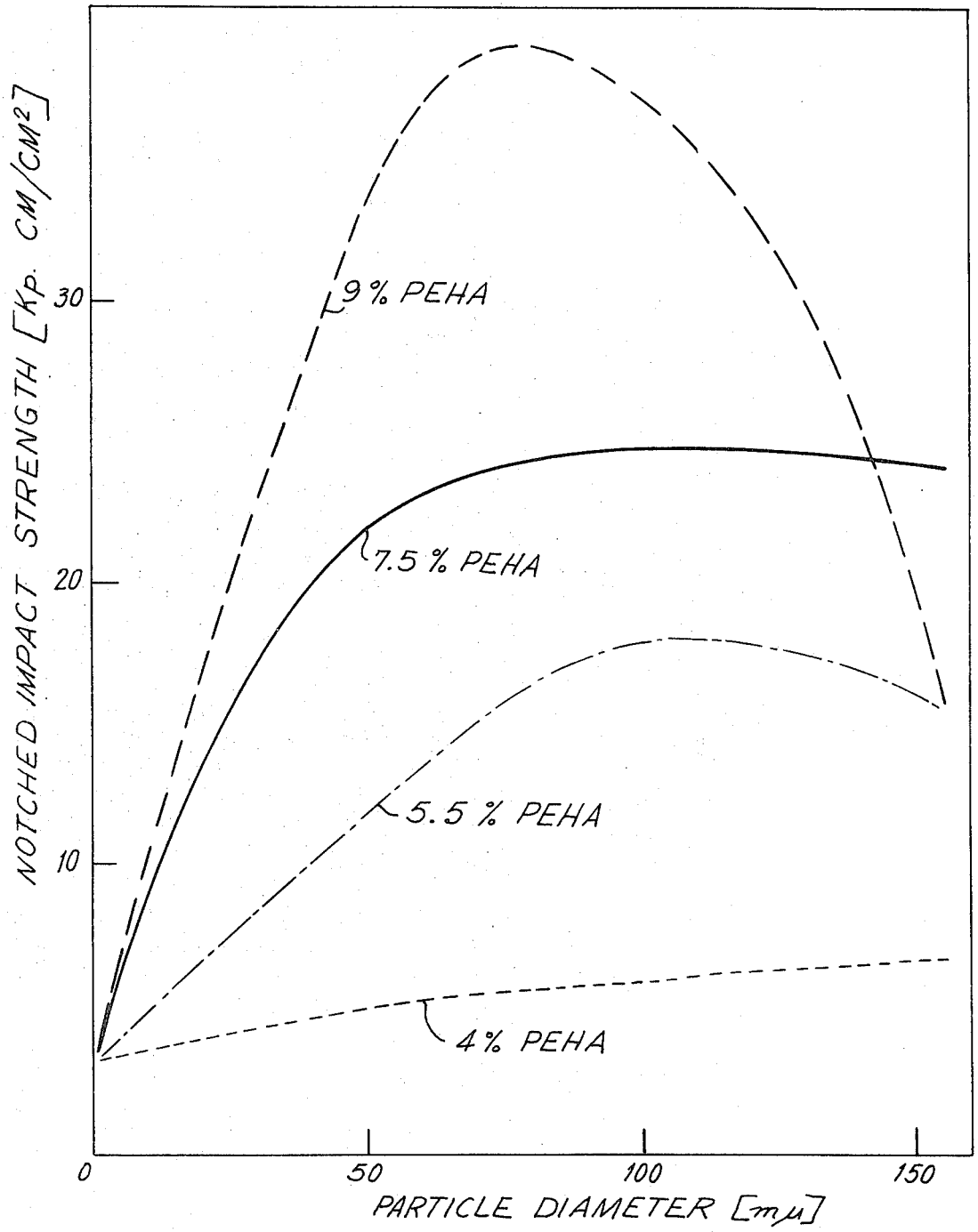
FIG. 3 is a plot of impact strength.

In FIGS. 2 and 3, the transparency (expressed as clouding) and the impact strength (notched) respectively, depending on the mean particle diameter of the polyacrylate for polymers of vinyl chloride with varying content of polymers of 2-ethylhexylacrylate, namely 4%, 5.5%, 7.5% and 9%, are plotted. As will be seen from the sketches, the curves for the impact strength (notched) show maximum values, whereas the curves for the transparency are rather straight lines, of which the slope depends on the polyacrylate content in the vinyl chloride polymer.

The range of the invention is limited by a maximum mean particle diameter and a minimum mean particle diameter, which has been defined above in dependence on the content of polyacrylate in the vinyl chloride polymer. The corresponding polymers of vinyl chloride show an improved impact strength and more especially in the preferred range simultaneously a good transparency. When using polyacrylates having medium particle diameters, below the indicated minimum a high transparency is achieved, but the impact strength no longer differs substantially from that of the unmodified polyvinyl chloride.

EXAMPLES (1) 6000 g. of salt-free water, 120 g. of lauric acid, 60 ml. of a 10 N-sodium hydroxide solution and 5 g. of potassium peroxide disulphate where introduced into a stainless steel, stirrer-type autoclave with a capacity of 12 litres and heated while stirring to 55° C. The autoclave was evacuated and purged by repeated introduction under pressure of oxygen-free nitrogen and evacuation; finally, nitrogen was forced in up to a pressure of 2 atm. gauge.

With an autoclave temperature of 55° C., 100 g. of 2-ethylhexylacrylate were pumped in within 2 minutes and, after 10 minutes, 900 g. of 2-ethylhexylacrylate were pumped in continuously for 100 minutes. After a total reaction time of 4 hours, the contents of the autoclave were relieved of pressure and coded. A thinly liquid dispersion was obtained with a solid content of about 14%. The mean particle diameter was determined by soap titration to be 25 mµ.

5400 g. of salt-free water, 700 g. of the above dispersion, containing about 100 g. of poly-2-ethylhexylacrylate, and 4 g. of potassium peroxide disulphate were introduced while stirring into a stainless steel stirrer-type autoclave with a capacity of 12 liters and heated to 59° C. The autoclave was evacuated and purged by repeated introduction of vinyl chloride under pressure and relieving the pressure. 1900 g. of vinyl chloride were added; the pressure was then 9.1 atm. gauge with the polymerization temperature of 59° C. After about 1½ hours, the conversion was about 75%; the pressure started to fall. The reaction was allowed to continue to about 4 atm. gauge, the unreacted vinyl chloride was relieved of pressure and cooled. The dispersion contained about 24% of solid substance. The polymer was isolated in the usual way by coagulation with electrolytes.

Two additional polymers of vinyl chloride were prepared in the same manner, but with the difference that the introduced quantity of poly-2-ethylhexylacrylate was 140 g. and 170 g., respectively, and the vinyl chloride quantity correspondingly amounted to 1860 g. and 1830 g.

By rolling mixtures of 60.5 parts by weight of vinyl chloride polymer, 1 part by weight of an organic thio-tin stabilizer and 1 part by weight of lubricant for 10 minutes at 180° C., on a mixing and rolling mill and pressing at 180° C., plates with a thickness of 1 mm. and 4 mm. were prepared. The impact strength (notched) of small standard rods was measured according to DIN 53453. The clouding was measured with the aid of the "Haze" meters of Evans Electroselenium Ltd., of Halstead (England), according to ASTM D 1003–61. As "Haze" or clouding is designated the ratio between the light T$d$ dispersed with passage through the specimen and the light T$t$ passing through without dispersion.

The reading is given in percent:

$$\text{Clouding} = \frac{Td}{Tt} \cdot 100 \text{ [Percent]}$$

The results are indicated in Table 1.

TABLE 1

| | Charge | | K-value | EHA, percent in VC-polymer | Clouding 1 mm. plate, percent | Impact strength (notched), kp. cm./cm.² |
| --- | --- | --- | --- | --- | --- | --- |
| | PEHA, g. | VC, g. | | | | |
| Control | 0 | 2,000 | 65.0 | 0.0 | 4 | 3.2 |
| Test Number: | | | | | | |
| 1 | 100 | 1,900 | 66.6 | 5.5 | 11 | 4.9 |
| 2 | 140 | 1,860 | 67.9 | 7.5 | 21 | 16.0 |
| 3 | 170 | 1,830 | 67.7 | 9.0 | 22 | 20.2 |

(2) A dispersion of poly-2-ethylhexylacrylate was prepared as in Example 1, but using only 60 g. of lauric acid and 30 ml. of sodium hydroxide solution instead of 120 g. and 60 ml., respectively. The mean particle diameter determined by soap titration was 43 mμ.

Four vinyl chloride polymers were prepared with the use of 60, 100, 140 or 170 g. of poly-2-ethylhexylacrylate in the form of the above dispersion, as in Example 1, formed into plates and tested. The results are reproduced in Table 2.

TABLE 2

| | Charge | | K-value | EHA, percent in VC-polymer | Clouding 1 mm. plate, percent | Impact strength (notched), kp. cm./cm.² |
| --- | --- | --- | --- | --- | --- | --- |
| | PEHA, g. | VC, g. | | | | |
| Test Number: | | | | | | |
| 4 | 60 | 1,940 | 66.6 | 4.0 | 7 | 5.2 |
| 5 | 100 | 1,900 | 67.4 | 5.6 | 16 | 8.8 |
| 6 | 140 | 1,860 | 69.5 | 7.7 | 22 | 21.1 |
| 7 | 170 | 1,830 | 69.4 | 9.0 | 34 | 27.4 |

(3) A dispersion of poly-2-ethylhexylacrylate was prepared as in Example 1, but using only 30 g. of lauric acid and 15 ml. of sodium hydroxide solution, instead of 120 g. and 60 ml., respectively. The mean particle diameter determined by soap titration was 74 mμ.

Four vinyl chloride polymers were prepared with the use of 60, 100, 140 or 170 g. of poly-2-ethylhexylacrylate in the form of the above dispersion as in Example 1, formed into plates and tested.

The resulting measurement values are indicated in Table 3.

TABLE 3

| | Charge | | K-value | EHA, percent in VC-polymer | Clouding 1 mm. plate, percent | Impact strength (notched), kp. cm./cm.² |
| --- | --- | --- | --- | --- | --- | --- |
| | PEHA, g. | VC, g. | | | | |
| Test Number: | | | | | | |
| 8 | 60 | 1,940 | 66.6 | 4.0 | 10 | 5.7 |
| 9 | 100 | 1,900 | 68.1 | 5.2 | 23 | 17.5 |
| 10 | 140 | 1,860 | 68.1 | 7.7 | 32 | 22.3 |
| 11 | 170 | 1,830 | 69.5 | 8.6 | 46 | 38.9 |

(4) 6000 g. of salt-free water, 20 g. of lauric acid, 10 ml. of a 10 N-sodium hydroxide solution and 1000 g. of 2-ethylhexylacrylate were placed in a stainless steel stirrer-type autoclave with a capacity of 12 liters and heated while stirring to 55° C. The autoclave was evacuated and purged by repeated introduction under pressure of oxygen-free nitrogen and evacuation; finally, nitrogen was forced in up to a pressure of 2 atm. gauge.

With an autoclave temperature of 55° C., 5 g. of potassium peroxide disulphate were introduced as a solution in 60 ml. of salt-free water. After 4 hours, the contents of the autoclave were relieved of pressure and cooled. A thinly liquid dispersion was obtained with a solid content of about 14% and a mean particle diameter, determined by soap titration, of 139 mμ.

Four vinyl chloride polymers were prepared with the use of 60, 100, 140 or 170 g. of poly-2-ethylhexylacrylate in the form of the above dispersion, as in Example 1, formed into plates and tested.

The measurement values are indicated in Table 4.

TABLE 4

| | Charge | | K-value | EHA, percent in VC-polymer | Clouding 1 mm. plate, percent | Impact strength (notched), kp. cm./cm.² |
| --- | --- | --- | --- | --- | --- | --- |
| | PEHA, g. | VC, g. | | | | |
| Test number: | | | | | | |
| 12 | 60 | 1,940 | 67.4 | 4.1 | 11 | 6.0 |
| 13 | 100 | 1,900 | 68.1 | 5.9 | 36 | 16.7 |
| 14 | 140 | 1,860 | 70.2 | 7.1 | 50 | 33.0 |

The tests 1 to 3 (Example 1), 4 to 7 (Example 2), 8 to 10 (Example 3) and 12 (Example 4) lie within the scope of the preferred range of the invention. The polymers are transparent and impact-resistant.

In the tests 11 (Example 3) and 13 and 14 (Example 4), which lie in the general range of the invention, the polymers show a very high impact strength (notched).

What is claimed is:

1. A process for the production of impact-resistant and weather-resistant polymers of vinyl chloride, by the emulsion polymerization of vinyl chloride in the presence of polymers of acrylic acid esters, comprising polymerizing, in the presence of an emulsifier, vinyl chloride in the presence of 2 to 10% by weight of a polymer of 2-ethylhexylacrylate containing at least 50% by weight of 2-ethylhexylacrylate, the polymerization of the vinyl chloride being conducted at temperatures from 50–65° C. with mixing at the saturation pressure of the vinyl chloride in the presence of liquid vinyl chloride such that the conversion amounts to 70%, the maximum mean particle diameter and the minimum mean particle diameter of the polymer of 2-ethylhexylacrylate in the polymer of the vinyl chloride, being determined by the following equations:

maximum mean particle diameter in m$\mu$=310—(24 times the concentration of the polymer of 2-ethylhexylacrylate in percent by weight as a whole number)

minimum mean particle diameter in m$\mu$=33—(3.5 times the concentration of the polymer of 2-ethylhexylacrylate in percent by weight as a whole number).

2. A process according to claim 1 wherein a mean particle diameter is used which is between the maximum preferred particle diameter in m$\mu$ of 260—(24 times concentration of the polymer of 2-ethylhexylacrylate in percent by weight) and the minimum preferred particle diameter in m$\mu$ of 33—(3.5 times concentration of the polymer of 2-ethylhexylacrylate in percent by weight).

3. A process according to claim 1 wherein a polymer of 2-ethylhexylacrylate is used which contains more than 90% by weight of 2-ethylhexylacrylate units.

4. A process according to claim 1 wherein a copolymer of 2-ethylhexylacrylate with acrylic acid esters, of which the ester group contains 1 to 6 carbon atoms, is used.

5. A process according to claim 1 wherein salts of fatty acids with 12 to 18 carbon atoms in the molecule are used as emulsifiers in quantities of 0.05 to 1% by weight, related to vinyl chloride.

6. A process according to claim 1 wherein the polymerization is carried out in the presence of polymerization regulators.

7. A process according to claim 1 wherein mercaptans are employed as regulators in quantities of 0.01 to 0.2% by weight, related to the vinyl chloride.

8. A process according to claim 1 wherein saturated and/or unsaturated halogenated hydrocarbons are employed as regulators, in quantities of 0.1 to 5% by weight, related to vinyl chloride.

9. A process according to claim 1 wherein water-soluble radical formers are used as catalysts.

10. A process according to claim 1 wherein the polymerization is carried out while stirring and at such a speed that a continuous supply of monomeric vinyl chloride to the polymerization centers is guaranteed.

11. A process according to claim 1 wherein 4–9% by weight of the polymer of 2-ethylhexylacrylate is used.

12. A product produced by the process of claim 1.

References Cited

UNITED STATES PATENTS

| | | | |
|---|---|---|---|
| 3,334,156 | 8/1967 | Calentine et al. | 260—884 |
| 3,548,034 | 12/1970 | Cleemann et al. | 260—884 |
| 2,862,912 | 12/1958 | Ott | 260—78.5 |
| 2,899,405 | 8/1959 | Coover | 260—884 |
| 3,206,424 | 9/1965 | Heinrich et al. | 260—29.6 |

MURRAY TILLMAN, Primary Examiner

C. DECCURO, Assistant Examiner

U.S. Cl. X.R.

260—23 AR, 29.6 RB

Disclaimer 3,776,982.—*Rene Nicolet, Walter Gutmann,* and *Theodor Volker,* Freiburg, Switzerland. PROCESS FOR THE PRODUCTION OF IMPACT RESISTANT TRANSPARENT POLYMERS OF VINYL CHLORIDE AND ACRYLIC ACID ESTER. Patent dated Dec. 4, 1973. Disclaimer filed Mar. 19, 1974, by the assignee, *Lonza Ltd.*

Hereby disclaims the portion of the term of the patent subsequent to Dec. 4, 1990.

[*Official Gazette November 19, 1974.*]